ISOLATOR

Filed June 28, 1966 3 Sheets-Sheet 1

INVENTOR

JAMES J. KERLEY, JR.

BY Robert G. McMorrow

ATTORNEY

INVENTOR
JAMES J. KERLEY, JR.
BY Robert G. McMorrow
ATTORNEYS

INVENTOR
JAMES J. KERLEY, JR.
BY Robert G. McMorrow
ATTORNEY

United States Patent Office 3,383,455
Patented May 14, 1968

3,383,455

ISOLATOR

James J. Kerley, Jr., 6203 Forest Road,
Cheverly, Md. 20785

Filed June 28, 1966, Ser. No. 564,708
11 Claims. (Cl. 174—52)

ABSTRACT OF THE DISCLOSURE

Isolation means for fragile component in which a sleeve of mesh material envelopes the component and is anchored at the ends of the sleeve in such manner as to minimize shock damage to the component.

This invention pertains to the mounting of components generally, and more specifically to the mounting of sensitive elements and the isolation of such elements from adverse effects occasioned by shock, vibration, combined vibration and shock with constant acceleration, radio frequency interference, and thermal damage degradation.

In the mounting of sensitive components in systems of various types, such as the electronic components often employed in weapons systems, flight vehicles, and the like, it is necessary to protect such components from various factors tending to damage or otherwise adversely affect the components. Various prior proposals for shock mountings of such components have included straps, springs, and similar non-rigid mounting means, but none of these previous proposals has provided the component with full isolation from the effects of shock and other factors. It is thus the primary objective of the present invention to provide an isolation mounting for sensitive components which effectively guards the components from shock, vibration, electrical interference, noise, and thermal damage.

Further objectives of the invention include the provision of a protective mounting of the class described above having multi-planar protective characteristics, one which substantially encloses the sensitive component, one which is readily adaptable to various sizes and configurations of components to be protected, and one having improved fatigue life, noise, vibration, and shock damping characteristics.

Additional objectives of the invention relate to an assembly for the isolation of sensitive electronic components or the like which effectively screens or shields the components from RF interference, and serves as a means for transfer of heat from the component to adjacent articles.

Other and further objects and advantages of the invention will become apparent to those skilled in the art from a consideration of the following specification, when read in conjunction with the annexed drawings, in which.

Figures 1, 2, 3, 4, 5:
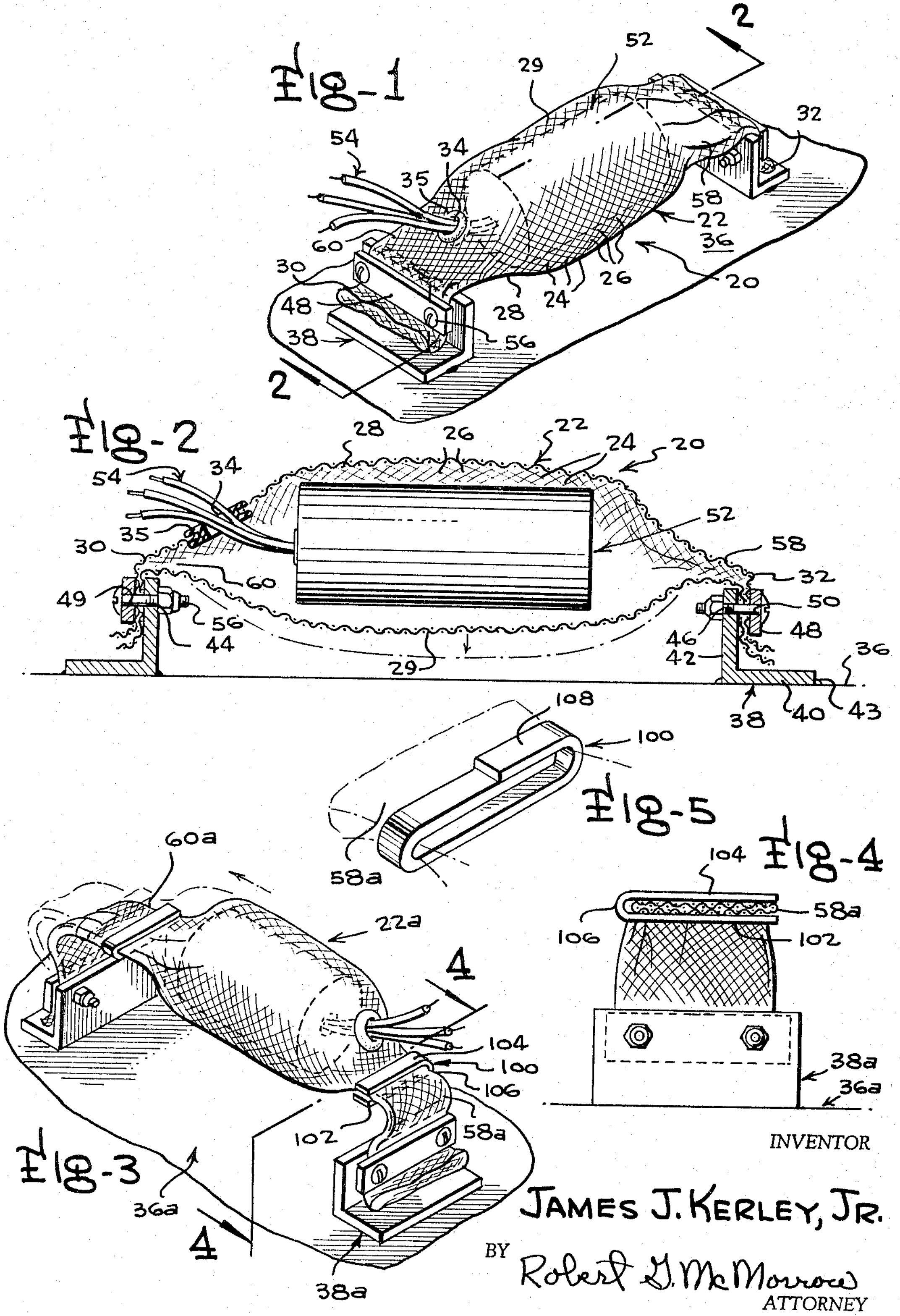
FIGURE 1 is a perspective view showing a first form of isolator constructed and assembled in accordance with the teachings of this invention.
FIGURE 2 is an enlarged sectional view taken substantially on the line 2—2 of FIGURE 1, looking in the direction of the arrows.
FIGURE 3 shows the elements of FIGURE 1 as embodied with an accessory clip means, and discloses, in phantom lines, movement of the assembly on impact.
FIGURE 4 is an enlarged, detailed cross section taken on the line 4—4 of FIGURE 3, looking in the direction of the arrows.
FIGURE 5 is a perspective view of a difference type of clip means.

As indicated, several embodiments of the invention are disclosed in the drawings. Each of these has in common the fabrication of its main body section from a length of tubular material of metallic mesh, or the like. In the first form of the invention, shown in FIGURE 1, the invention is generally designated by reference numeral 20, and includes an elongated sleeve 22 formed of metallic mesh material. The mesh construction is dictated by the size, weight and type of component to be isolated, and comprises a first group of strands 24 arranged substantially parallel to one another, and a second group of strands 26 which are substantially parallel to one another and substantially perpendicular to the first group. The strands are interwoven, but not interconnected, thus merely frictionally engaging one another at their intersections 28. This frictional contact at the intersections 28 produces a damping effect on movement of the sleeve, as for example on impact, thus reducing the magnitude of transmitted shock.

The sleeve 22 includes a central body section 29 and opposite end sections 30 and 32 and has an opening 34 therein intermediate these end sections. The opening is surrounded by a grommet 35 to shield its edges, whereby it permits the entry of electrical lead wires into the sleeve, as appears more fully below.

Environment of employment of the mount hereof is, of course, subject to wide variance. In FIGURE 1, the device is shown applied to a generally planar surface 36. Oppositely arranged L-shaped brackets 38, each having a foot portion 40 and leg portion 42, are included in the assembly, the foot portion being connected, as by welds 43, to the surface 36. The upstanding leg portions are preferably arranged in spaced apart, facing relation to one another, and each has a pair of apertures 44, 46 formed therein. A clamping plate 48 is supplied and is dimensioned to overlie or extend across each of the leg portions 42. The plates have holes 49 and 50 therein which are aligned in use with the apertures 44 and 46, respectively. As seen in the drawing, the sleeve 22 is of a length from end to end somewhat greater than the distance between the leg portions 42 of the opposite brackets.

The central body section 29 of the sleeve is adapted to house therein a sensitive component such as an electron tube 52 or the like having lead wires 54 extending through the grommet 35. The end sections 30 and 32 of the sleeve are clamped between the leg portions 42 of the brackets 38 and the clamping plates 48, and suitable fastening means, such as screw and bolt assemblies 56, are extended through each of the pairs of openings in order to secure the sleeves in place. Due to the length of the sleeve with respect to the distance between the leg portions, the sleeve is crimped somewhat, as at the areas indicated at 58 and 60, between the main body section 29 and its respective ends 30 and 32 thereby further reducing the transmittal of shock or vibration from the surface 36 to the component 52. Since the degree of shock wave transmittal is a function of the frictional contact of the metallic strand elements 24 and 26, the increased dimension of the sleeve further reduces the danger of damage to the protected component.

FIGURES 3 through 5 disclose a first modification of the invention. In the drawing, elements corresponding to those heretofore described are identified by the same reference numerals, a letter *a* being added for distinction. In order to further enhance the shock damping and isolation functions of the assembly, the crimped end sections 58*a* and 60*a* of the sleeve 22*a* are supplied with encircling clips 100. The clips may be either in the forms shown in FIGURES 3 and 4 (wherein they are substantially of U-shape comprising arms 102, 104 connected by a bendable bridge 106) or in FIGURE 5 (where an overlap section 108 completes the annular form thereof) shape being optional. In either case, the effect of use is to optimize the vibration or sound isolation qualities of the assembly, and to decrease the natural vibration frequency thereof. FIGURE 3 shows, in phantom lines, a typical movement of the assembly on impact.

Figures 6, 7:
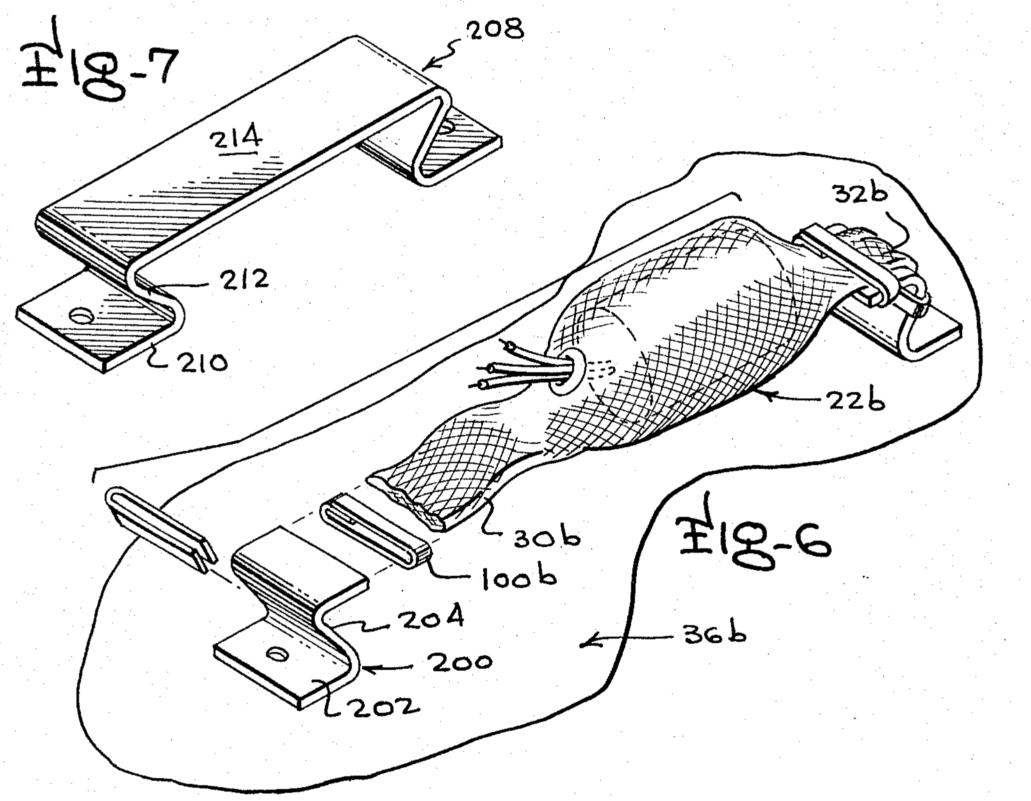
FIGURE 6 shows a further modification, partially disassembled in perspective.
FIGURE 7 is a perspective view of a modified type of bracket hereof.

FIGURES 6 and 7 disclose modifications of the hold down means for the assembly, here the letter *b* being appended to reference numerals identifying the same or corresponding elements. In FIGURE 6, the surface 36*b* has a pair of serpentine brackets 200 secured in spaced relation thereon, each bracket including a base 202, upwardly arched mid-section 204 and top 206. The sleeve ends 30*b*, 32*b* are extended about the tops 206 and portions of the mid-sections 204, and clips 100*b* (of either of the above described forms) are bent thereabout at at least the mid-section and the top. The mount is employed where added weight supporting ability and stability are required. The bracket 208 of FIGURE 7 is illustrative of still another possible configuration of the hold down means wherein the bracket 208 has bases 210, arched legs 212, and a top 214. The end section of the sleeve may be attached to the top 214 in any manner required by the weight and bulk of the component.

Figure 8:
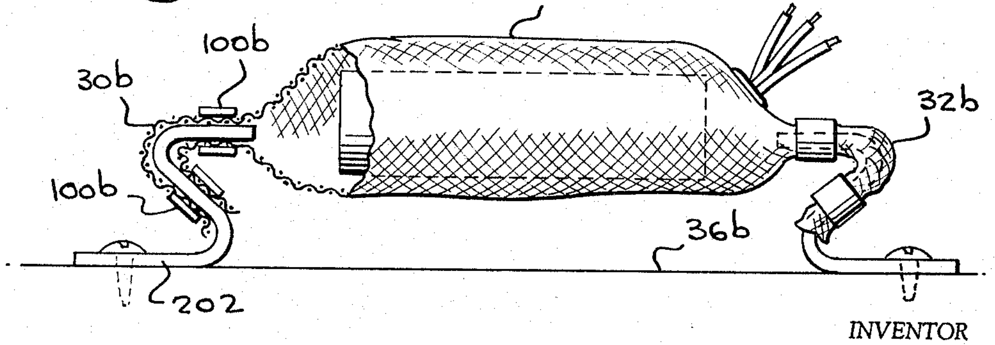
FIGURE 8 is a side elevational view, partially broken away for disclosure of details, of another modified form of the invention.

FIGURE 8 shows the assembly of elements of FIGURE 6 in another possible adaptation of use. Here, the ends 30*b* and 32*b* are in an enveloping relation to the tops 206 and portions of the mid-sections 204 of the brackets, with the clips 100*b* disposed about each.

Figures 9, 10, 11, 12:
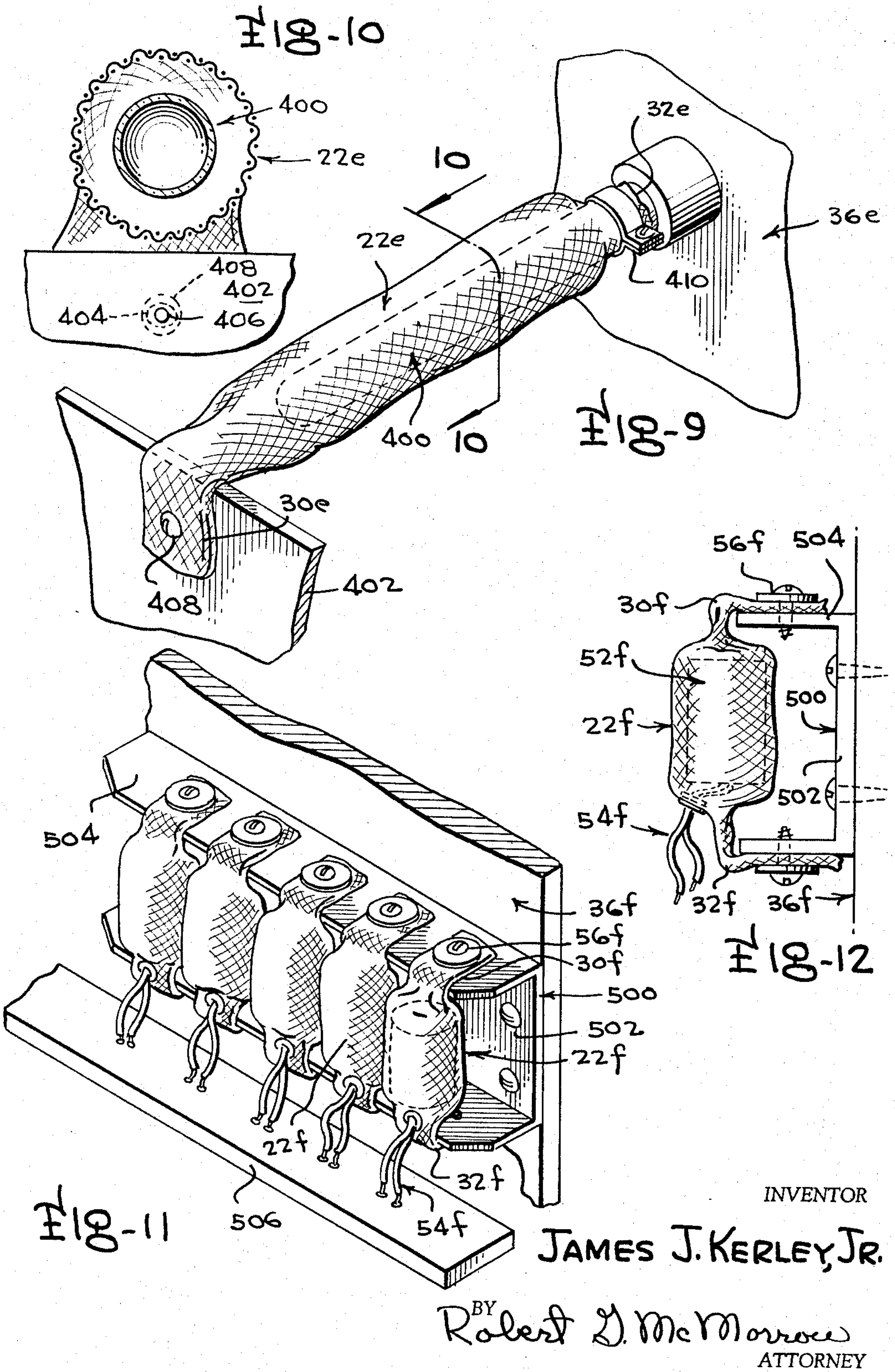
FIGURE 9 is a perspective view of a further modified use of the components hereof.
FIGURE 10 is an enlarged vertical cross section taken substantially on the section line 10—10 of FIGURE 9, looking in the direction of the arrows.
FIGURE 11 is a perspective view of a further modification.
FIGURE 12 is an end elevational view of the apparatus shown in FIGURE 11.

In the case of base mounted components such as the tube 400 shown in FIGURES 9 and 10, the present invention, in a modified form, includes a sleeve open at one of its ends 32*e* and loosely engaged about the tube. The tube extends from a first supporting surface 36*e* and a second element 402 is located adjacent thereto. The distal end 30*e* of the sleeve has an opening 404 therein alignable with a hole 406 in the element 402. A changeable fastener 408 is then employed to connect the distal end to the second element. The open end 32*e* of the sleeve 22*e* is clamped about the tube by a suitable C-ring 410. The mesh of the sleeve 22*e* not only seals the tube from radiation, but also serves as a medium of heat transfer between the tube and the second element.

Finally, in FIGURES 11 and 12, a multiplicity of sleeves 22*f* are employed on a unitary bracket 500 having a base 502 fixed to a supporting surface 36*f*. The ends 30*f*, 32*f* of the respective sleeves are connected by changeable fasteners 56*f* to a continuous apertured leg element 504. A circuit board 506 or the like located adjacent the bracket is related to the sheathed equipment 52*f* by leads 54*f*.

Several embodiments of the invention have been above illustrated by way of example, and not by way of limitation. It will be observed that the general concept of the invention is applicable to other forms and shapes of sleeve elements and other and different types of mounting means so long as characteristic features of the invention are retained. It will therefore be understood that the invention is to be limited in scope only by the appended claims.

What is claimed is:

1. An isolation means for a sensitive component adjacent a support media, the isolation means comprising:

a sleeve dimensioned to at least partially encase the component, the sleeve having at least one end section;

the sleeve having a mesh construction and including interwoven strand elements frictionally engaged at multiple intersections; and means including at least one support bracket securing the end section to the support media, and the sleeve being gathered and crimped in a direction remotely spacing the component from the support media.

2. The invention of claim 1, wherein:

the strands are metallic.

3. The invention of claim 2, wherein:

the sleeve has a pair of opposite end sections; and the means secure each of the end sections to the support media.

4. The invention of claim 2, wherein:

the means securing the end sections to the support media comprise a bracket having a clamping portion engaging the end section.

5. The invention of claim 2, wherein:

the means securing the end sections to the support media comprise brackets of serpentine form; and the sleeve end sections envelope a portion of the bracket.

6. The invention of claim 4, wherein:

the sleeve includes a crimp section adjacent the end section.

7. The invention of claim 6, and:

a clip about the crimp section.

8. The combination, with a support media and a component sensitive to heat, shock, vibration and electrical interference, and electrical lead means associated with the component, of an isolation sheath for the component comprising:

an elongated sleeve of a length substantially greater than that of the component, the sheath including opposite end sections and a central body section, the central body section being in enveloping relation to the component;

the sheath being formed of a metallic mesh composed of a substantially parallel first series of strands and a second series of substantially parallel strands, the series being interwoven and being generally perpendicular to one another with the strands frictionally crossing one another at multiple intersections;

a pair of mounting brackets secured to the support media at a selected distance from one another, said distance being at least less that the length of the sleeves;

the sleeve end sections being secured to the brackets such that crimp sections are formed between the respective end sections and the central body sections; and the sleeve having opening means therein for extension of the electrical lead means therethrough.

9. The invention of claim 8, and:

clips about the crimp sections.

10. The invention of claim 8, wherein:

a plurality of sleeves are mounted on a common bracket.

11. The invention of claim 8, wherein:

the end sections envelope portions of the bracket; and clips extended about the end sections.

References Cited

UNITED STATES PATENTS

| | | | |
|---|---|---|---|
| 2,956,672 | 10/1960 | Kirkpatrick | 206—46 |

FOREIGN PATENTS

| | | |
|---|---|---|
| 28,133 | 1909 | Great Britain. |
| 237,322 | 3/1924 | Great Britain. |

ROY D. FRAZIER, *Primary Examiner.*

F. J. FOSS, *Assistant Examiner.*